(12) United States Patent
Bottari et al.

(10) Patent No.: US 8,934,768 B2
(45) Date of Patent: Jan. 13, 2015

(54) CONFIGURING A PATH IN AN OPTICAL COMMUNICATIONS NETWORK

(75) Inventors: Giulio Bottari, Leghorn (IT); Diego Caviglia, Savona (IT); Daniele Ceccarelli, Genoa (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 221 days.

(21) Appl. No.: 13/699,799

(22) PCT Filed: Jun. 16, 2010

(86) PCT No.: PCT/EP2010/058449
§ 371 (c)(1),
(2), (4) Date: Feb. 10, 2013

(87) PCT Pub. No.: WO2011/150982
PCT Pub. Date: Dec. 8, 2011

(65) Prior Publication Data
US 2013/0142508 A1  Jun. 6, 2013

(30) Foreign Application Priority Data

Jun. 2, 2010 (EP) .................................... 10164677

(51) Int. Cl.
H04J 14/00 (2006.01)
H04B 10/00 (2013.01)
H04B 10/27 (2013.01)
H04J 14/02 (2006.01)

(52) U.S. Cl.
CPC ............... *H04B 10/27* (2013.01); *H04J 14/02* (2013.01)
USPC ............................................. 398/25; 398/57

(58) Field of Classification Search
CPC ..................... H04J 2203/0058; H04B 10/0793
USPC ...................................................... 398/25, 57
See application file for complete search history.

(56) References Cited

U.S. PATENT DOCUMENTS 7,058,012 B1 * 6/2006 Chen et al. .................... 370/222
2004/0208504 A1 * 10/2004 Solheim et al. ................. 398/16
2009/0116833 A1 * 5/2009 Shimizu et al. ................... 398/2

FOREIGN PATENT DOCUMENTS

WO 2006/000510 A1 1/2006
WO 2007/024317 A2 3/2007

OTHER PUBLICATIONS

PCT Search Report, mailed Feb. 18, 2011, in connection with International Application No. PCT/EP2010/058449.
Bernstein, G. et al. "A Framework for the Control of Wavelength Switched Optical Networks (WSON) with Impairments" Network Working Group Internet Draft, Feb. 6, 2009.
Lee, Y. (ed.) et al. "Framework for GMPLS and PCE Control of Wavelength Switched Optical Networks (WSON)" Network Working Group Internet Draft, Apr. 5, 2010.

* cited by examiner

*Primary Examiner* — Danny Leung
(74) *Attorney, Agent, or Firm* — Leffler Intellectual Property Law, PLLC

(57) ABSTRACT

A method of configuring a path between an ingress node and an egress node in an optical communications network, the path comprising a first hop and a subsequent hop. The method includes: a) selecting a candidate hop for the first hop of the path; b) obtaining a value of a signal feasibility parameter for the candidate hop; c) determining whether said value lies within an acceptable value range and if one is, accepting said candidate hop for the first hop of the path, and if one is not, repeating steps a. to c.; d) selecting a candidate hop for the subsequent hop of path; e) obtaining a value of a signal feasibility parameter for a combined path comprising the first hop and the candidate hop for the subsequent hop of the path; f) determining whether said value lies within an acceptable value range, if one is, acceptable value range accepting said candidate hop for the subsequent hop of the path, and if one is not, repeating steps d. and e.; and g) generating and transmitting a control signal for configuring the path. Each step of obtaining a value of a signal feasibility parameter comprises checking whether a measured value of the signal feasibility parameter is available, and if one is, retrieving said measured value and if one is not, calculating an estimated value of the signal feasibility parameter.

16 Claims, 7 Drawing Sheets

CONFIGURING A PATH IN AN OPTICAL COMMUNICATIONS NETWORK

CROSS-REFERENCE TO RELATED APPLICATIONS

This application claims priority under 35 U.S.C. §119 to European Patent Application No. 10164677.6, filed Jun. 2, 2010, which is hereby incorporated herein by reference in its entirety.

TECHNICAL FIELD

The invention relates to a method of configuring a path between an ingress node and an egress node in an optical communications network. The invention further relates to an optical communications network element and an optical communications network.

BACKGROUND

Dynamic optical networks are increasingly being introduced due to the availability of all optical switching technology such as wavelength selective switches embedded in (remotely) reconfigurable add drop multiplexers. A proposed control plane for optical networks is the generalized multi protocol label switching (GMPLS) protocol suite being developed by the internet engineering task force (IETF). The GMPLS application to optical networks is called wavelength switched optical network (WSON). The work of the IETF on WSON is detailed in its document "The framework for the control of wavelength switched optical networks (WSON) with impairments" (draft-ietf-ccamp-wson-impairments-02.txt). The IETF has also looked at proposing path computation element (PCE) technology to configure paths in optical networks, as summarized in its document "Framework for GMPLS and PCE control of wavelength switched optical networks" (draft-ietf-ccamp-rwa-wson-framework-06.txt).

The effect of physical constraints of the optical network, often referred to as impairments, impacts the routing of an optical signal across the network. The effect of impairments must be considered during the configuration of a path across an optical network to ensure that the optical signal transmitted across the path has sufficient quality to enable traffic carried by the signal to be detected at a receiver. The optical signal quality is usually quantified using a quality of transmission (QoT) parameter, which is strictly related to the bit error rate (BER) of the optical signal. The IETF documents referred to above propose estimating a QoT value for a path to be configured, the estimated QoT being based on information about the physical layer of the optical network and modeling of the physical layer performances. Using an estimated QoT value has the drawback that the QoT value is only an approximate value, and it is possible that the actual QoT of the path across the network will in fact not be acceptable, causing the path to fail. An alternative proposed in the IETF documents is to use a measured value of the QoT of the path to be configured. This can overcome the inaccuracy of the estimated QoT approach but the path can only be configured using a measured QoT value if the path has previously been configured. Traffic must have previously been successfully transmitted across the path, to allow the BER of the transmitted traffic signal to be measured and the QoT to be calculated.

SUMMARY

It is an object to provide an improved method of configuring a path between an ingress node and an egress node in an optical communications network. It is a further object to provide an improved optical communications network element. It is a further object to provide an improved optical communications network.

A first aspect of the invention provides a method of configuring a path between an ingress node and an egress node in an optical communications network, the path comprising a first hop and a subsequent hop. The method comprises:
  a. Selecting a candidate hop for the first hop of the path;
  b. Obtaining a value of a signal feasibility parameter for the candidate hop;
  c. Determining whether said value lies within an acceptable value range. If said value lies within said acceptable value range, accepting said candidate hop for the first hop of the path. If said value lies outside said acceptable value range, repeating steps a. to c.;
  d. Selecting a candidate hop for the subsequent hop of path;
  e. Obtaining a value of a signal feasibility parameter for a combined path comprising the first hop and the candidate hop for the subsequent hop of the path;
  f. Determining whether said value lies within an acceptable value range. If said value lies within said acceptable value range, accepting said candidate hop for the subsequent hop of the path. If said value lies outside said acceptable value range, repeating steps d. to f.; and
  g. Generating and transmitting a control signal for configuring the path.

Wherein each said step of obtaining a value of a signal feasibility parameter comprises checking whether a measured value of the signal feasibility parameter is available. If a said measured value is available, said step further comprises retrieving said measured value. If a said measured value is not available, said step further comprises calculating an estimated value of the signal feasibility parameter.

The method may therefore be used to configure a path utilising both estimated and measured signal feasibility parameters to assess the feasibility of the path. The method is able to configure a path based on a mixture of measured and estimated impairments to evaluate the feasibility of the path. The method is able to use existing signal feasibility parameters where available, with estimated values for signal feasibility parameters only being required to be calculated for a first hop or a combined path for which no measured value is available. The use of measured signal feasibility parameters, where available, may reduce the time required to configure the path and may reduce the number of signal feasibility parameter estimations to be calculated. Using measured signal feasibility parameters may improve the accuracy of the assessment of the feasibility of the path to be configured, and may therefore reduce the probability that the path will fail once installed. This may provide improved service availability where the path is configured for recovery purposes. The method may be particularly advantageous for high bit rate transmission systems, such as 40 Gbps and above, since the impact of impairments in high bit rate networks is more severe and the necessary mitigation, such as chromatic dispersion compensation, is more difficult to implement.

In an embodiment, the method further comprises measuring a value of at least one signal quality parameter of the path at the egress node and storing said at least one measured value. The method may therefore be able to measure a signal quality parameter of the configured path, once the path has been installed, and may therefore provide a further measured signal feasibility parameter for use in configuring subsequent paths using the method. The method may be implemented to exploit knowledge of the network obtained through measurements made from previously configured paths. As the method is repeatedly implemented on a network, an increasing number of measured feasibility parameters may be obtained and the accuracy of the method may therefore increase as a result of less calculations of signal feasibility parameter estimations being required as a larger number of measured values are available.

In an embodiment, the signal quality parameter comprises one of optical signal to noise ratio, polarisation mode dispersion, chromatic dispersion, and self phase modulation.

In an embodiment, method further comprises generating and transmitting a measurement signal containing the at least one signal quality parameter. In an embodiment, the method comprises transmitting the measurement signal using a Path Computation Element Communication Protocol extension. The measured signal quality parameter may therefore be transmitted across the network, for provision to one or more locations where the method may be implemented.

In an embodiment, the path comprises a plurality of subsequent hops and the method comprises repeating steps d. to f. for each subsequent hop. The combined path for a current said subsequent hop comprising the first hop, all previously accepted subsequent hops and the candidate hop for the current subsequent hop. The method may therefore be used to configure a path comprising a plurality of subsequent hops, with a value of a signal feasibility parameter being obtained for each combined path for each hop along the path as it is configured.

In an embodiment, the candidate hops are selected using an impairment aware routing and wavelength assignment algorithm. In an embodiment, the impairment aware routing and wavelength assignment algorithm comprises one of a Dijkstra algorithm and a Bandari algorithm.

In an embodiment, the path is an unprotected path and the Dijkstra algorithm is used to select candidate hops. In an embodiment, the path is a protected path and the Bandari is used to select candidate hops.

In an embodiment, the signal feasibility parameter comprises a Quality of Transmission parameter.

In an embodiment, if a measured value of the signal feasibility parameter is not available step e. comprises calculating an estimated value of the Quality of Transmission parameter for the combined path based on an optical signal to noise ratio value for each hop.

In an embodiment, step e. comprises calculating an estimated value of the Quality of Transmission parameter for the combined path additionally based on a polarisation mode dispersion value, forward error correction gain value and dispersion penalty value for each hop.

In an embodiment, the at least one signal quality parameter comprises one of optical signal to noise ratio and bit error rate.

In an embodiment, the optical communications network comprises a central control plane and the method comprises transmitting the control signal using an Internet Engineering Task Force RFC 5557 Path Computation Element Communication Protocol.

In an embodiment, the optical communications network comprises a distributed control plane and the method comprises transmitting the control signal using one of an Internet Engineering Task Force OSPF-TE routing protocol and an Internet Engineering Task Force RSVP-TE signalling protocol.

A second aspect of the invention provides an optical communications network element comprising a memory device and a path computation element. The memory device is arranged to store one or more measured values of a signal quality parameter. The path computation element arranged to configure a path between an ingress node and an egress node in an optical communications network, the path comprising a first hop and a subsequent hop. The path computation element is arranged to:
  a. Select a candidate hop for the first hop of the path;
  b. Obtain a value of a signal feasibility parameter for the candidate hop;
  c. Determine whether said value lies within an acceptable value range. If said value lies within said acceptable value range, accept said candidate hop for the first hop of the path. If said value lies outside said acceptable value range repeat steps a. to c.;
  d. Select a candidate hop for the subsequent hop of path;
  e. Obtain a value of a signal feasibility parameter for a combined path comprising the first hop and the candidate hop for the subsequent hop of the path;
  f. Determine whether said value lies within an acceptable value range. If said value lies within said acceptable value range, accept said candidate hop for the subsequent hop of the path. If said value lies outside said acceptable value range, repeat steps d. to f.; and
  g. Generate and transmit a control signal for configuring the path.
  Wherein said path computation element is arranged to obtain a value of a signal feasibility parameter by checking whether a measured value of the signal feasibility parameter is available in the memory device. The path computation element is further arranged to, if a said measured value is available, retrieve said measured value from the memory device. The path computation element is further arranged to, if a said measured value is not available, calculate an estimated value of the signal feasibility parameter.

The optical communications network element may therefore configure a path utilising both estimated and measured signal feasibility parameters to assess the feasibility of the path. The path computation element is able to configure a path based on a mixture of measured and estimated impairments to evaluate the feasibility of the path. The path computation element is able to use existing signal feasibility parameters where available, with estimated values for signal feasibility parameters only being required to be calculated for a first hop or a combined path for which no measured value is available. The use of measured signal feasibility parameters, where available, may reduce the time required to configure the path and may reduce the number of signal feasibility parameter estimations to be calculated. Using measured signal feasibility parameters may improve the accuracy of the assessment of the feasibility of the path to be configured, and may therefore reduce the probability that the path will fail once installed. This may provide improved service availability where the path is configured for recovery purposes. The optical communications network element may be particularly advantageous for use in high bit rate transmission systems, such as 40 Gbps and above, since the impact of impairments in high bit rate networks is more severe and the necessary mitigation, such as chromatic dispersion compensation, is more difficult to implement.

In an embodiment, the path computation element is further arranged to receive a measured value of at least one signal quality parameter of the path from the egress node and to cause said at least one measured value to be stored in the memory device. The path computation element may therefore be able to receive a signal quality parameter of the configured path, once the path has been installed, and may therefore store a further measured signal feasibility parameter in the memory device for use in configuring subsequent paths. The path computation element may therefore be able to exploit knowledge of the network obtained through measurements made from previously configured paths. As traffic is repeatedly routed across the network on paths configured by the path computation element an increasing number of measured feasibility parameters may be obtained and the path computation element may configure paths with increasing accuracy as a result of less calculations of signal feasibility parameter estimations being required as a larger number of measured values are available.

In an embodiment, the signal quality parameter comprises one of optical signal to noise ratio, polarisation mode dispersion, chromatic dispersion, and self phase modulation.

In an embodiment, the path comprises a plurality of subsequent hops and the path computation element is arranged to repeat steps d. to f. for each subsequent hop. The combined path for a current said subsequent hop comprising the first hop, all previously accepted subsequent hops and the candidate hop for the current subsequent hop. The path computation element may therefore be able to configure a path comprising a plurality of subsequent hops, with a value of a signal feasibility parameter being obtained for each combined path for each hop along the path as it is configured by the path computation element.

In an embodiment, the path computation element is arranged to select the candidate hops using an impairment aware routing and wavelength assignment algorithm. In an embodiment, the impairment aware routing and wavelength assignment algorithm comprises one of a Dijkstra algorithm and a Bandari algorithm.

In an embodiment, the path is an unprotected path and the path computation element is arranged to select the candidate hops using the Dijkstra algorithm. In an embodiment, the path is a protected path and the path computation element is arranged to select the candidate hops using the Bandari algorithm.

In an embodiment, the signal feasibility parameter comprises a Quality of Transmission parameter.

In an embodiment, the path computation element is arranged to calculate an estimated value of the Quality of Transmission parameter for the combined path based on an optical signal to noise ratio value for each hop.

In an embodiment, the Quality of Transmission parameter for the combined path is additionally based on a polarisation mode dispersion value, forward error correction gain value and dispersion penalty value for each hop.

In an embodiment, the memory device is arranged to store one or more of an optical signal to noise ratio value, a polarisation mode dispersion value, forward error correction gain value and dispersion penalty value for each hop in a traffic engineering database.

In an embodiment, the at least one signal quality parameter comprises one of optical signal to noise ratio and bit error rate.

In an embodiment, the optical communications network comprises a central control plane and the path computation element is arranged to transmit the control signal using an Internet Engineering Task Force RFC 5557 Path Computation Element Communication Protocol.

In an embodiment, the optical communications network comprises a distributed control plane and the path computation element is arranged to transmit the control signal using one of an Internet Engineering Task Force OSPF-TE routing protocol and an Internet Engineering Task Force RSVP-TE signalling protocol.

A third aspect of the invention provides an optical communications network comprising an optical communications network element and a node. The optical communications network element is as described above. The node comprises optical signal monitoring apparatus and a controller. The optical signal monitoring apparatus is arranged to measure an optical parameter of a received optical signal. The controller is arranged to determine a signal quality parameter from said measured optical parameter. The controller is further arranged to generate a measurement signal containing the signal quality parameter and to transmit said measurement signal to the optical communications network element.

A path may be configured across the optical communications network utilising both estimated and measured signal feasibility parameters to assess the feasibility of the path. The path may be configured based on a mixture of measured and estimated impairments to evaluate the feasibility of the path. The path computation element is able to use existing signal feasibility parameters where available, with estimated values for signal feasibility parameters only being required to be calculated for a first hop or a combined path for which no measured value is available. The use of measured signal feasibility parameters, where available, may reduce the time required to configure the path and may reduce the number of signal feasibility parameter estimations to be calculated. Using measured signal feasibility parameters may improve the accuracy of the assessment of the feasibility of the path to be configured, and may therefore reduce the probability that the path will fail once installed. This may provide improved the network with service availability where the path is configured for recovery purposes. The optical communications network may be particularly advantageous for transmitting high bit rate traffic, such as 40 Gbps and above, since the impact of impairments in high bit rate networks is more severe and the necessary mitigation, such as chromatic dispersion compensation, is more difficult to implement.

In an embodiment, the controller is arranged to transmit the measurement signal from the node to the path computation element of the optical communications network element using a Path Computation Element Communication Protocol extension.

In an embodiment, the signal quality parameter comprises one of optical signal to noise ratio, polarisation mode dispersion, chromatic dispersion, and self phase modulation.

In an embodiment, the optical communications network comprises a centralised control plane and the path computation element is provided in a network management system.

In an embodiment, the optical communications network comprises a distributed control plane and a plurality anodes and a said path computation element is provided in each node.

A fourth aspect of the invention provides a data carrier having computer readable instructions embodied therein for providing access to resources available on a processor. The computer readable instructions comprising instructions to cause the processor to configure a path between an ingress node and an egress node in an optical communications network, the path comprising a first hop and a subsequent hop. The instructions comprise instructions to cause the processor to:
 a. Select a candidate hop for the first hop of the path;
 b. Obtain a value of a signal feasibility parameter for the candidate hop;
 c. Determine whether said value lies within an acceptable value range. If said value lies within said acceptable value range, accept said candidate hop for the first hop of the path. If said value lies outside said acceptable value range, repeat steps a. to c.;
 d. Select a candidate hop for the subsequent hop of path;
 e. Obtain a value of a signal feasibility parameter for a combined path comprising the first hop and the candidate hop for the subsequent hop of the path;

f. Determine whether said value lies within an acceptable value range. If said value lies within said acceptable value range, accept said candidate hop for the subsequent hop of the path. If said value lies outside said acceptable value range, repeat steps d. to f.; and g. Generate a control signal for configuring the path.

Wherein said value of a signal feasibility parameter is obtained by checking whether a measured value of the signal feasibility parameter is available. If a said measured value is available, said value of a signal feasibility parameter is obtained by retrieving said measured value. If a said measured value is not available, said value of a signal feasibility parameter is obtained by calculating an estimated value of the signal feasibility parameter.

DETAILED DESCRIPTION

Figure 1:
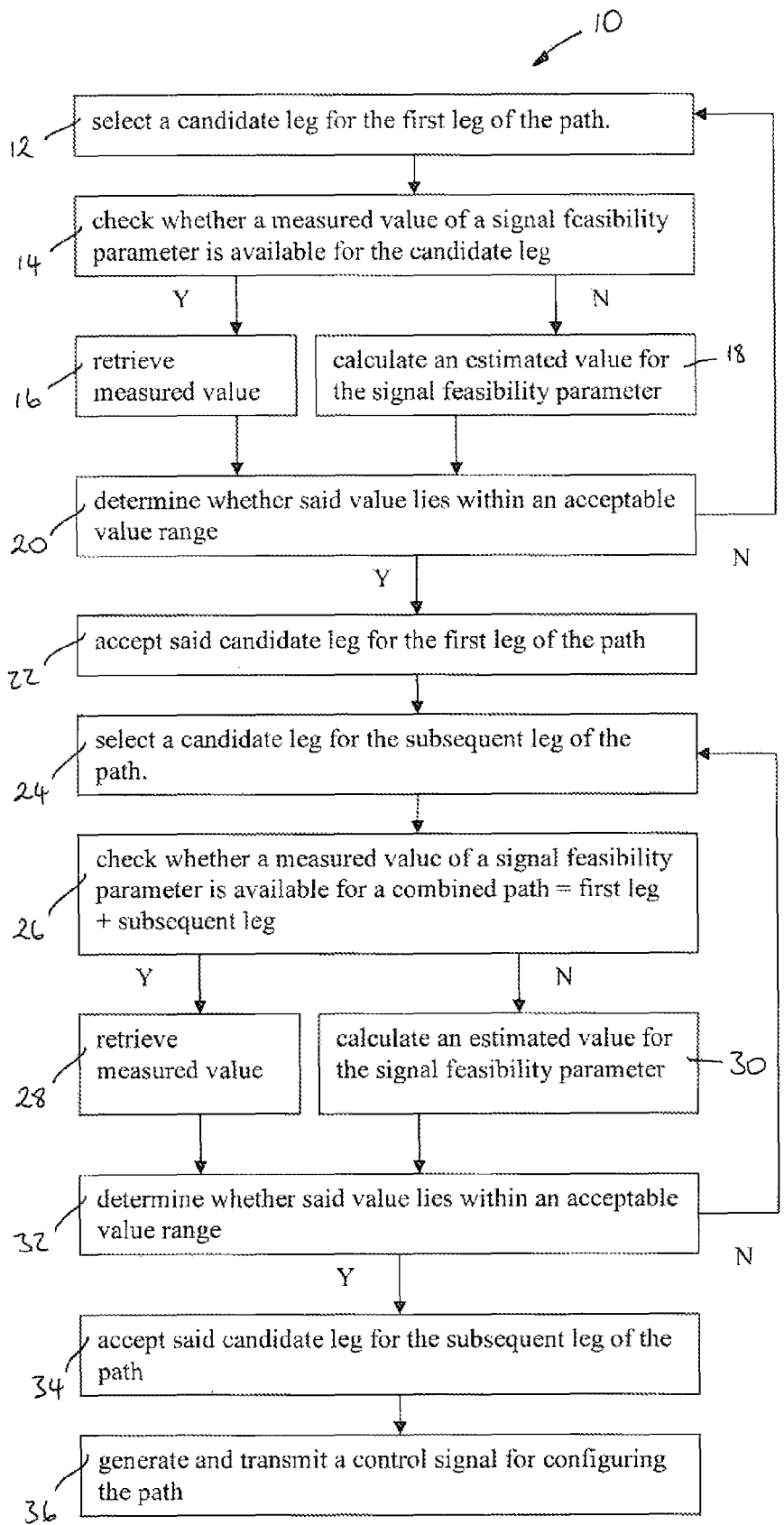
FIG. 1 shows the steps of a method of configuring a path between an ingress node and an egress node in an optical communications network according to a first embodiment of the invention.

Referring to FIG. 1, a first embodiment of the invention provides a method 10 of configuring a path between an ingress node and an egress node in an optical communications network. The path comprises a first hop and a subsequent hop.

The method comprises selecting a candidate hop for the first hop of the path 12 and then obtaining a value of a signal feasibility parameter for the candidate hop. The signal feasibility parameter is obtained by checking whether a measured value of the signal feasibility parameter is available for the candidate hop 14. If a measured value is available, the method comprises retrieving the measured value 16. If a measured value is not available, the method comprises calculating an estimated value for the signal feasibility parameter 18. The method further comprises determining whether the value of the signal feasibility parameter, either retrieved 16 or calculated 18, lies within an acceptable value range 20. If the value lies within an acceptable value range the method comprises accepting the candidate hop for the first hop of the path 22. If the value does not lie within an acceptable value range the method comprises repeating the steps of selecting a candidate hop for the first hop of the path 12, obtaining a value of the signal feasibility parameter for the candidate hop 14, 16, 18 and determining whether the new value lies within an acceptable value range 20.

The method 10 further comprises selecting a candidate hop for the subsequent hop of the path 24 and obtaining a value of a signal feasibility parameter for a combined path comprising the first hop and the candidate hop for the subsequent hop of the path. The signal feasibility parameter value is obtained by checking whether a measured value of the signal feasibility parameter is available for the combined path 26 and, if a measured value is available, retrieving the measured value 28. If a measured value is not available, the method comprises calculating an estimated value for the signal feasibility parameter 30. The method further comprises determining whether the value of the signal feasibility parameter of the combined path, either retrieved 28 or calculated 30, lies within an acceptable value range 32. If the signal feasibility parameter value lies within an acceptable value range the method comprises accepting the candidate hop for the subsequent hop of the path 34. If the signal feasibility parameter value of the combined path does not lie within an acceptable value range the method comprises repeating the steps of selecting a candidate hop for the subsequent hop of the path 24, obtaining a value of a signal feasibility parameter for a combined path comprising the first hop and the new candidate hop 26, 28, 30, and determining whether the new value of the signal feasibility parameter lies within an acceptable value range 32.

Once a candidate hop has been accepted for the subsequent hop of the path, the method comprises generating and transmitting a control signal for configuring the path 36.

The method 10 is thus able to evaluate the feasibility of a path based on both measured values of signal feasibility parameters, where available, and estimated values of signal feasibility parameters. Estimations of the feasibility of a light path are therefore only required to be made where a measured value of a signal feasibility parameter is not available for the first hop of the path or the combined path. Using measured signal feasibility parameters may increase the accuracy of the assessment of the feasibility of both the first hop and the combined path.

Figure 2:
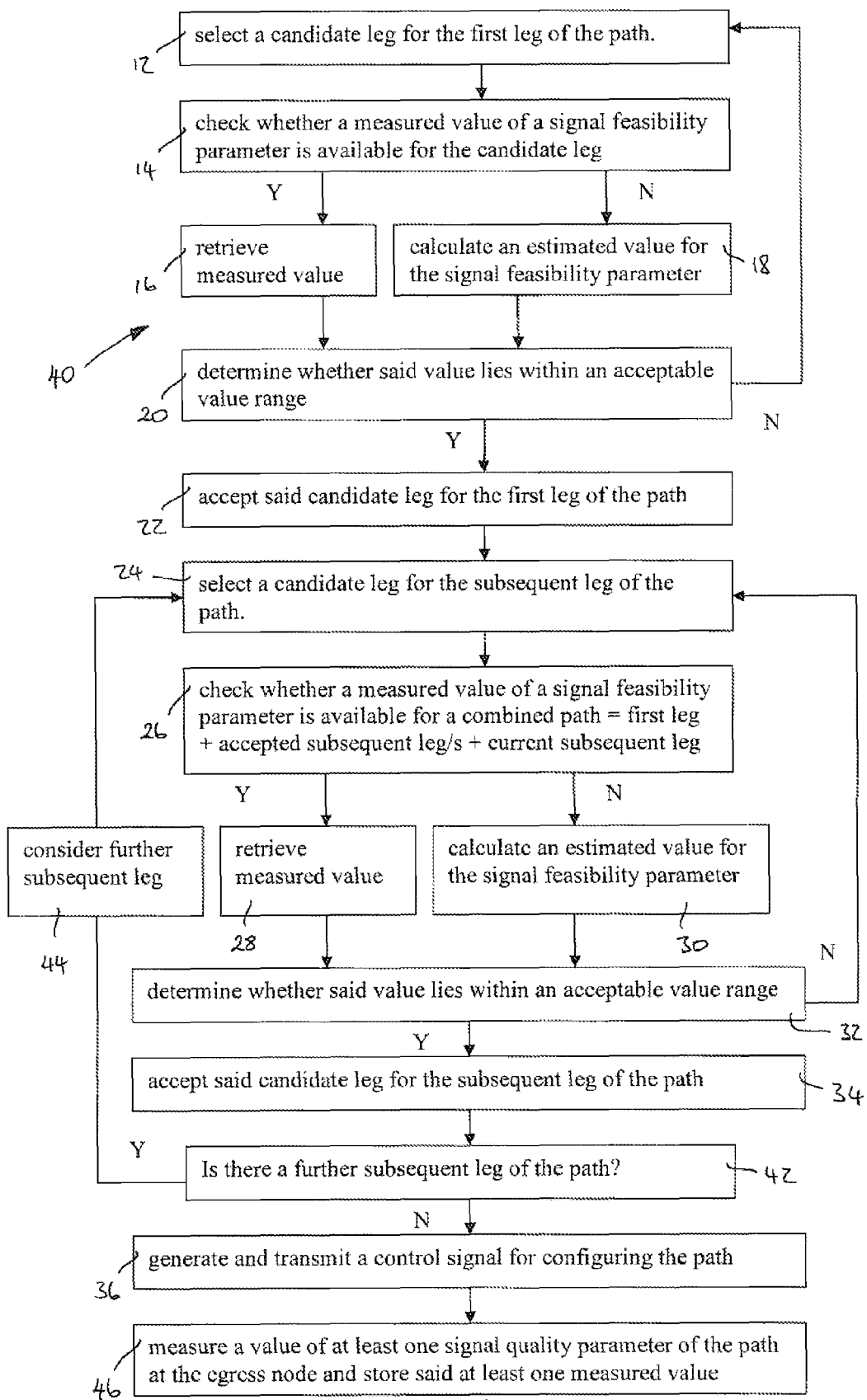
FIG. 2 shows the steps of a method of configuring a path between an ingress node and an egress node in an optical communications network according to a second embodiment of the invention.

The steps of a method 40 of configuring a path between an ingress node and an egress node in an optical communications network according to a second embodiment of the invention are shown in FIG. 2. The method 40 of this embodiment is substantially the same as the method 10 of FIG. 1, with the following modifications. The same reference numbers are retained for corresponding steps.

In this embodiment, the path comprises a first hop and a plurality of subsequent hops. Following the acceptance of a candidate hop for a first subsequent hop of the path, as described above in relation to FIG. 1. The method 40 further comprises determining whether there is a further subsequent hop of the path 42 and considering the further subsequent hop 44. The method 40 therefore repeats the selection of a candidate hop for the current subsequent hop of the path 24 and obtains a value of a signal feasibility parameter for a combined path comprising the first hop, the accepted subsequent hop and the candidate hop for the current subsequent hop of the path. In this embodiment, the step of obtaining a value of a signal feasibility parameter for the combined path comprises checking whether a measured value of the signal feasibility parameter is available for the combined path 26 and, if a measured value is available, retrieving the measured value 28. If a measured value is not available, the method comprises calculating an estimated value for the signal feasibility parameter of the combined path 30. The method 40 further comprises determining whether the value of the signal feasibility parameter of the combined path lies within an acceptable value range 32. If the value does lie within an acceptable value range the method 40 comprises accepting the candidate hop for the current subsequent hop of the path 34. If the value does not lie within an acceptable value range the method comprises repeating the steps of selecting a candidate hop for the current subsequent hop of the path 24 and obtaining a value of a signal feasibility parameter for a combined path comprising the first hop, the accepted subsequent hop and the new candidate hop for the current subsequent hop.

Once a candidate hop has been accepted for the current subsequent hop, the method 40 checks whether there are any further subsequent hops of the path 42. If there are no further subsequent hops, the method generates and transmits a control signal for configuring the path 36. If there are further subsequent hops, the process is repeated.

In this embodiment, the method 40 further comprises measuring a value of at least one signal quality parameter of the path at the egress node and storing the measured value 46. The measured value of the signal quality parameter of the path can then be used to determine a signal feasibility parameter for use in configuring a future path which at least in part comprises the path which has just been configured. The method 40 thus obtains measured signal feasibility parameters for future use. In this way, the number of measured values of signal feasibility parameters of paths within the optical communications network can be increased and updated during operation of the network.

Figure 3:
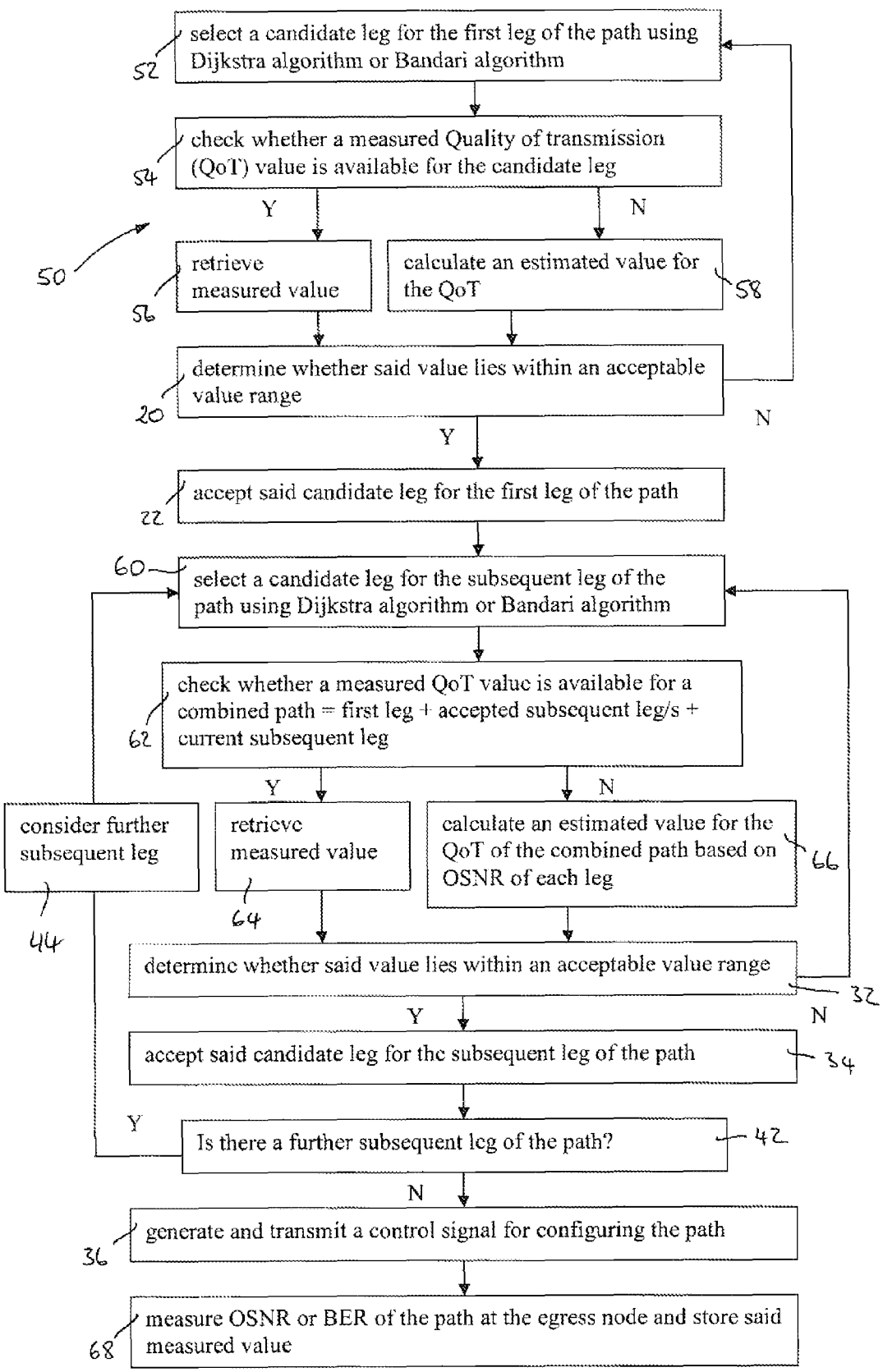
FIG. 3 shows the steps of a method of configuring a path between an ingress node and an egress node in an optical communications network according to a third embodiment of the invention.

FIG. 3 shows the steps of a method 50 of configuring a path between an ingress node and an egress node in an optical communications network according to a third embodiment of the invention. The method 50 of this embodiment is substantially the same as the method 40 of FIG. 2, with the following modifications. The same reference numbers are retained for corresponding steps.

In this embodiment, the candidate hop for the first hop of the path is selected using the Dijksdra algorithm or the Bandari algorithm 52. The step of obtaining a value of a signal feasibility parameter for the candidate hop comprises obtaining a quality of transmission (QoT) value for the candidate hop by firstly checking whether a measured QoT value is available 54. If a measured value is available, the measured value 56 is retrieved. If a measured QoT value is not available for the candidate hop an estimated value for the QoT 58 is calculated.

In this embodiment, the step of selecting a candidate hop for the or each subsequent hop of the path comprises selecting a candidate hop using the Dijksdra algorithm or the Bandari algorithm 60. The step of obtaining a value of a signal feasibility parameter for a combined path comprising the first hop, any accepted subsequent hops and the current subsequent hop comprises obtaining a QoT value for the combined path. The QoT value is obtained by checking whether a measured QoT value is available for the combined path 62 and if a measured QoT value is available retrieving the measured value 64. If a measured QoT value is not available, the method comprises calculating an estimated value for the QoT of the combined path 66. The QoT of the combined path is estimated based on the optical signal to noise ratio (OSNR) of each hop, namely the first hop, each accepted subsequent hop and the current subsequent hop.

Once a QoT value has been obtained, the method comprises determining whether the QoT value lies within an acceptable range 32.

In this embodiment, the method 50 comprises measuring the OSNR or the bit error rate (BER) of the path at the egress node, following configuration of the path 36, and storing the measured value 68. The measured OSNR or BER values of the configured path may be used to determine a QoT value for the path, to be stored for future use in a later path comprising at least in part the path which has just been configured.

Where an estimated value of the QoT of the combined path is required, this calculated 66 based on the OSNR of each hop and further takes into account the polarization mode dispersion (PMD), forward error correction (FEC) gain and dispersion penalty of each hop. The QoT value of the combined path may be calculated using the algorithm QoT=Q (OSNR−OSNR$_{pen}$−Q$_{pen}$+FEC$_{gain}$−Q$_{thr}$, using the method of assessing the feasibility of a composite optical path in an optical communications network described in WO2006/000510.

In the method 50 of this embodiment, the Dijksdra algorithm is used to select the candidate paths if the path to be configured is an unprotected path and the Bandari algorithm is used to select candidate hops for the first hop and the subsequent hops where the path to be configured is a protected path, having both a primary path and a backup path.

Figure 4:
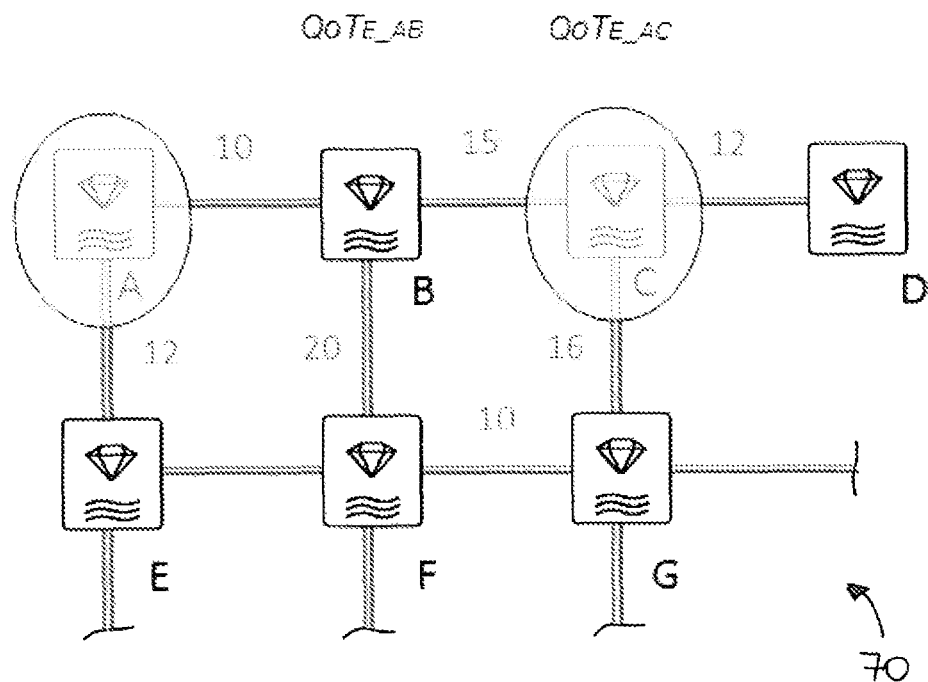
FIG. 4 is a first diagrammatic representation of a part of an optical communications network illustrating the configuration of a first path using the method of FIG. 3.

The configuration of a path using the method shown in FIG. 3 will now be described in detail with reference to FIGS. 4 to 6. To configure a path from node A to node C in an optical communications network 70, the method 50 first selects a candidate hop for the first hop of the path 52. In this example, the hop AB is selected as the candidate hop as it has the lowest administrative cost of the two hops starting from node A (namely the hop from node A to node B and the hop from node A to node E). The method then checks whether a QoT value is available for the hop AB 54. In this example, a measured QoT value is not available and the method therefore calculates an estimated value for the QoT 58 of AB (QoT$_{E\_AB}$) and determines whether the estimated QoT value lies within an acceptable value range. Assuming for brevity that the QoT value is acceptable, the method accepts hop AB as the first hop 22 of the path AC.

The method then selects a candidate hop for the subsequent hop of the path 60. In this example, hop BC is selected as it has the lowest administrative cost of the two hops starting from node B (namely BC and BF). The method then checks whether a measured QoT value is available for the combined path AC 62. In this example, no measured QoT value is available and the method therefore calculates an estimated value for the QoT of the combined path AC 66 based on the OSNR of each of hops AB and BC, using the algorithm above. The method then determines whether the QoT value (QoT$_{E\_AC}$) lies within an acceptable value range 32. Assuming, for brevity that the QoT$_{E\_AC}$ value is acceptable, the method accepts BC for the subsequent hop of the path 34. As C is the egress node there are no further subsequent hops of the path and the method proceeds to generating and transmitting a control signal for configuring the path AC.

Once the path has been configured and installed, the OSNR is measured at node C and the corresponding QoT value calculated and stored for future use.

Figure 5:
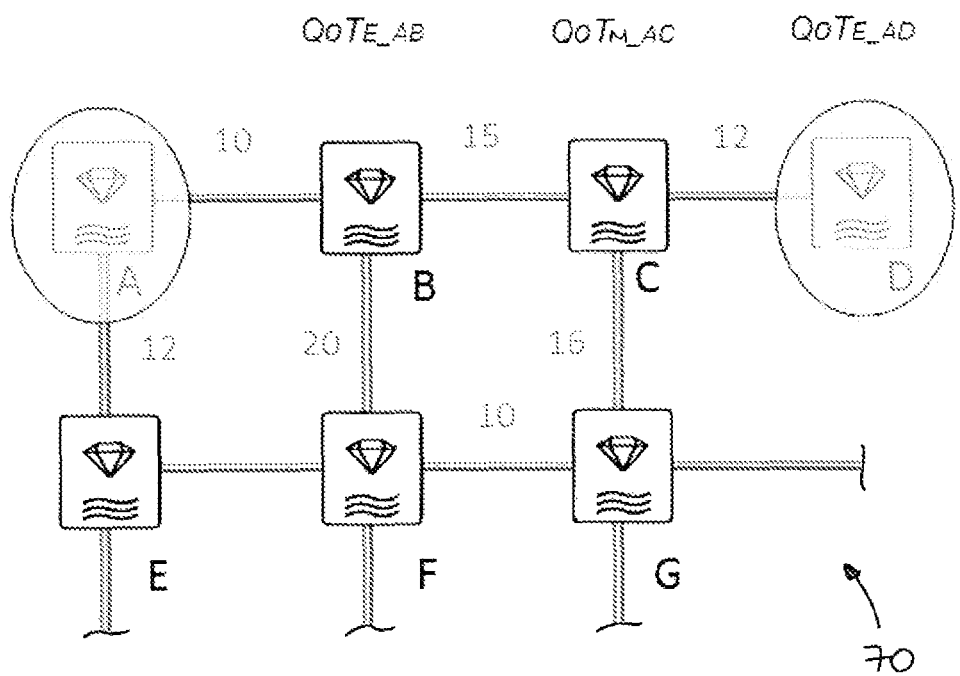
FIG. 5 is a second diagrammatic representation of the optical communications network shown in FIG. 4 illustrating the configuration of a second path using the method of FIG. 3.

Referring to FIG. 5, at a subsequent time the method 50 configures a path from ingress node A to egress node D. As previously, when configuring the path AC, the method selects hop AB as the first hop of the path and selects hop BC as a candidate hop for the subsequent hop of the path 60. The method then checks whether a measured QoT value is available for the combined path AC 62. As this has been previously measured and stored, a measured QoT$_{M\_AC}$ value is available and the method retrieves the measured value 64. The method then proceeds to determining whether the measured QoT$_{M\_AC}$ value lies within an acceptable value range 32 and, assuming for brevity that it does, the method accepts hop BC for the subsequent hop of the path 34.

As node C is not the egress node, the method 50 determines that there is a further subsequent hop of the path 42 and considers the further subsequent hop 44. The method then selects a candidate hop for the next subsequent hop of the path, which in this example comprises hop CD as it has the lowest administrative cost of the hops starting from node C (namely CD and CG). The method 50 then checks whether a measured QoT value is available for the combined path AD. In this example, there is not a measured QoT value for AD and so the method proceeds to calculating an estimated value QoT$_{E\_AD}$ for the QoT of the combined path AD based on the OSNR on each of hops AB, BC and CD. Once QoT$_{E\_AD}$ has been calculated the method determines whether QoT$_{E\_AD}$ lies within an acceptable value range 32 and, assuming for brevity that it does, the method accepts hop CD as the current subsequent hop of the path 34. Node D is the egress node of the path to be configured and so the method determines that there is no further subsequent hop of the path 42 and proceeds to generate and transmit a control signal for configuring the path AD.

The method 50 further comprises measuring the OSNR or BER of the path AD at node D and calculating and storing the QoT value for path AD for future use.

The path AD is thus configured with a process of assessing the feasibility of each hop of the path as it is constructed based on both estimated QoT and measured QoT values.

Figure 6:
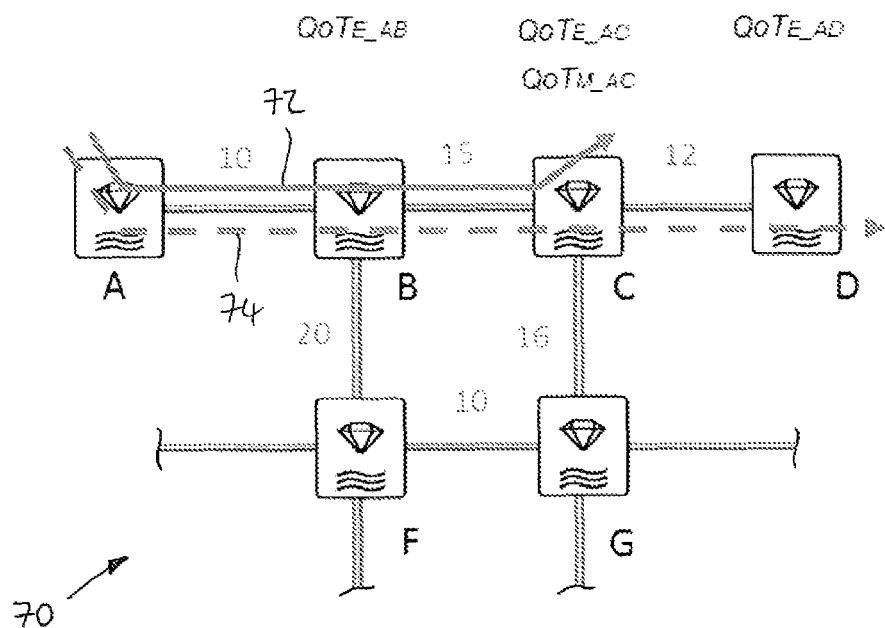
FIG. 6 is a third diagrammatic representation of the optical communications network shown in FIG. 4 illustrating the configuration of a third path using the method of FIG. 3.

As illustrated in FIG. 6, the previously established path 72 from node A to node C has provided a measured QoT value for AC which can then be used in assessing the feasibility of a path 74 from node A to node D.

Figure 7:
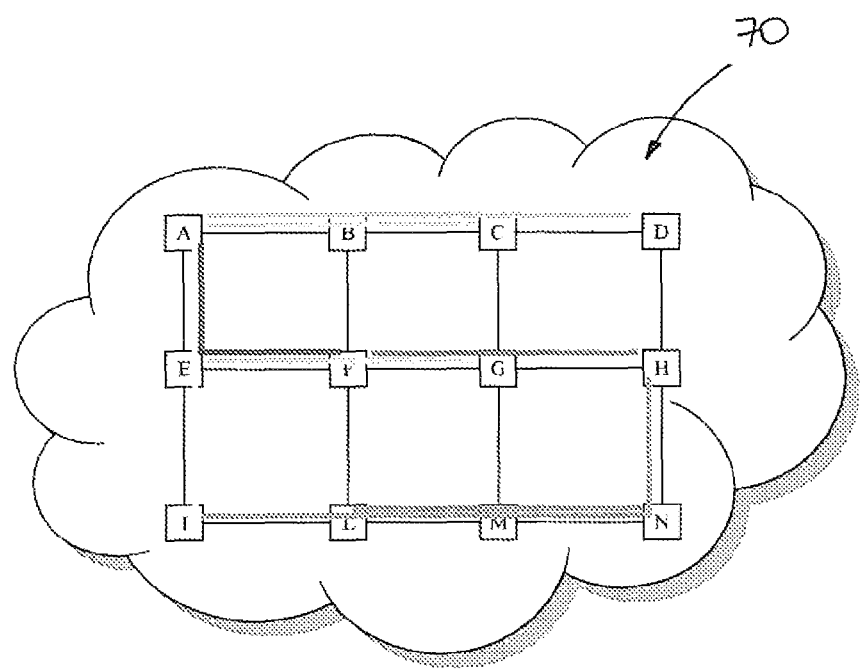
FIG. 7 is a diagrammatic representation of the optical communications network shown in FIG. 4 illustrating various measured Quality of Transmission (QoT) available for paths within the network.

As illustrated in FIG. 7, over a period of time, operation of the method 50 in respect of the optical communications network 70 will result in the set of measured QoT values for various paths, AC, AD, AI, AF, EG, FH, IH and LN. These values may be used in assessing the feasibility of a subsequently configured path within the network 70 which at least in part comprises one of the previously configured paths.

Figure 8:
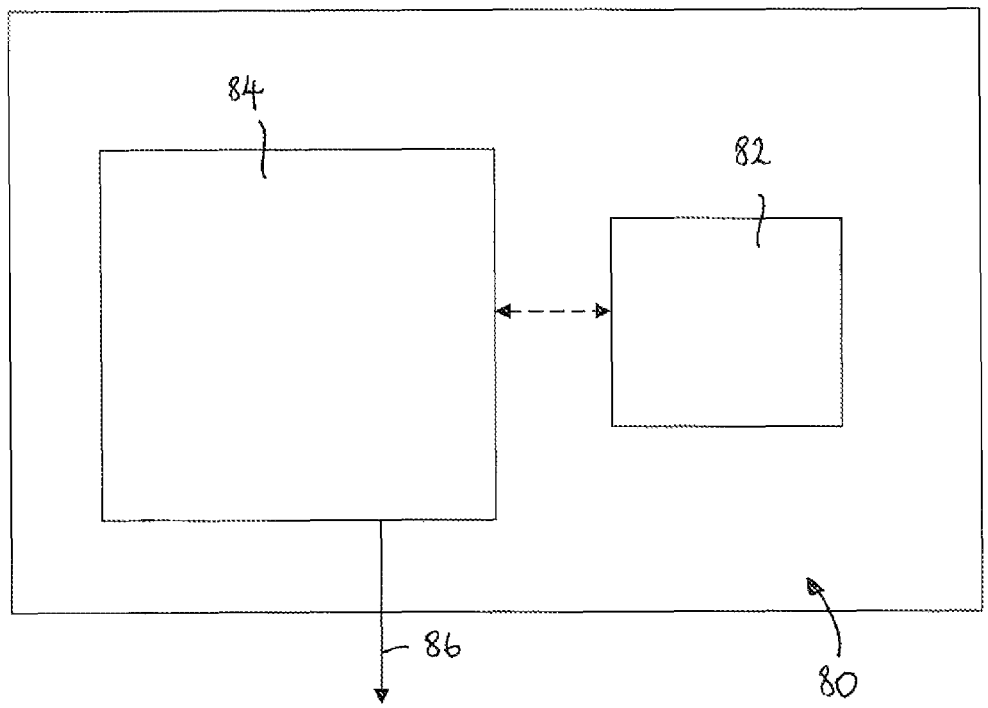
FIG. 8 is a schematic representation of an optical communications network element according to a fourth embodiment of the invention.

A fourth embodiment of the invention provides an optical communications network element 80 as shown in FIG. 8. The optical communications network element 80 comprises a memory device 82 and a path computation element 84. The memory device 82 is arranged to store one or more measured values of a signal quality parameter. The path computation element (PCE) 84 is arranged to configure a path between an ingress node and an egress node in an optical communications network. The path comprises a first hop and a subsequent hop.

The path computation element 84 is arranged to select a candidate hop for the first hop of the path and to obtain a value of a signal feasibility parameter for the candidate hop. The PCE is further arranged to determine whether the obtained value of the signal feasibility parameter lies within an acceptable range. If the value lies within the acceptable range, the PCE is arranged to accept the candidate hop for the first hop of the path. If the value lies outside the acceptable range, the PCE is arranged to repeat the steps of selecting a candidate hop and obtaining a value for the signal feasibility parameter, and determining whether the value lies within an acceptable value range.

If the obtained signal feasibility parameter value lies within an acceptable range, the PCE is arranged to select a candidate hop for the subsequent hop of the path. The PCE 84 is further arranged to obtain a value of a signal feasibility parameter for a combined path comprising the first hop and the candidate hop for the subsequent hop of the path. The PCE 84 is further arranged to determine whether the obtained value of the signal feasibility parameter lies within an acceptable value range. The PCE 84 is arranged, if the value lies within the acceptable value range, to accept the candidate hop for the subsequent hop of the path. The PCE 84 is further arranged, if the value lies outside the acceptable value range, to repeat the steps of selecting a candidate hop for the subsequent hop of the path and obtaining a value of the signal feasibility parameter for the combined path, comprising the first hop and the new candidate hop for the subsequent hop of the path. The PCE 84 is further arranged to again determine whether the new signal feasibility parameter value lies within the acceptable value range.

The PCE 84 is arranged to obtain a value of a signal feasibility parameter for the first hop or for the combined path by checking whether a measured value of the signal feasibility parameter for the first hop or for the combined path is available in the memory device. If a measured value is available, the PCE 84 is arranged to receive the measured value from the memory device. If a measured value is not available, the PCE 84 is arranged to calculate an estimated value of the signal feasibility parameter.

The PCE 84 is arranged, if the signal feasibility parameter value lies within the acceptable value range, to generate and transmit a control signal 86 for configuring the path.

Where the optical communications network comprises a central control plane the PCE 84 is arranged to transmit the control signal using the IETF RFC5557PCEP protocol. Where the optical communications network comprises a distributed control plane, the PCE 84 is arranged to transmit the control signal using one of the IETF OSPF-TE routing protocol and the IETF RSVP-TE signalling protocol.

In a further embodiment, the PCE 84 is further arranged to receive a measured value of at least one signal quality parameter, such as OSNR or BER, of the configured path from the egress node, to calculate the corresponding QoT, and to cause the measured QoT value to be stored in the memory device 82. The memory device 82 comprises a traffic engineering database and is arranged to store the received values in the traffic engineering database.

The path may comprise a plurality of subsequent hops and the PCE 84 is arranged to repeat the steps of selecting a candidate hop for a subsequent hop, and obtaining a value of a signal feasibility parameter for a combined path comprising the first hop, each previously accepted subsequent hop and the candidate hop for the current subsequent hop. The PCE 84 is further arranged to determine whether the signal feasibility parameter of the combined path lies within an acceptable value range, as described above.

The PCE 84 is arranged to select the candidate hops using an impairment aware routing and wavelength assignment algorithm, such as the Dijksdra algorithm or the Bandari algorithm, the Dijksdra algorithm is used where the path to be configured is an unprotected path and the Bandari algorithm is used where the path to be configured is a protected path, comprising a backup path and a protection path.

In the further embodiment, the signal feasibility parameter comprises a QoT parameter. The PCE 84 is arranged to calculate an estimated value of the QoT for the combined path based on an ONSR or BER value of each hop of the combined path. As described above the estimated QoT value for the combined path may be calculated using the algorithm and method described in WO2006/000510.

Figure 9:
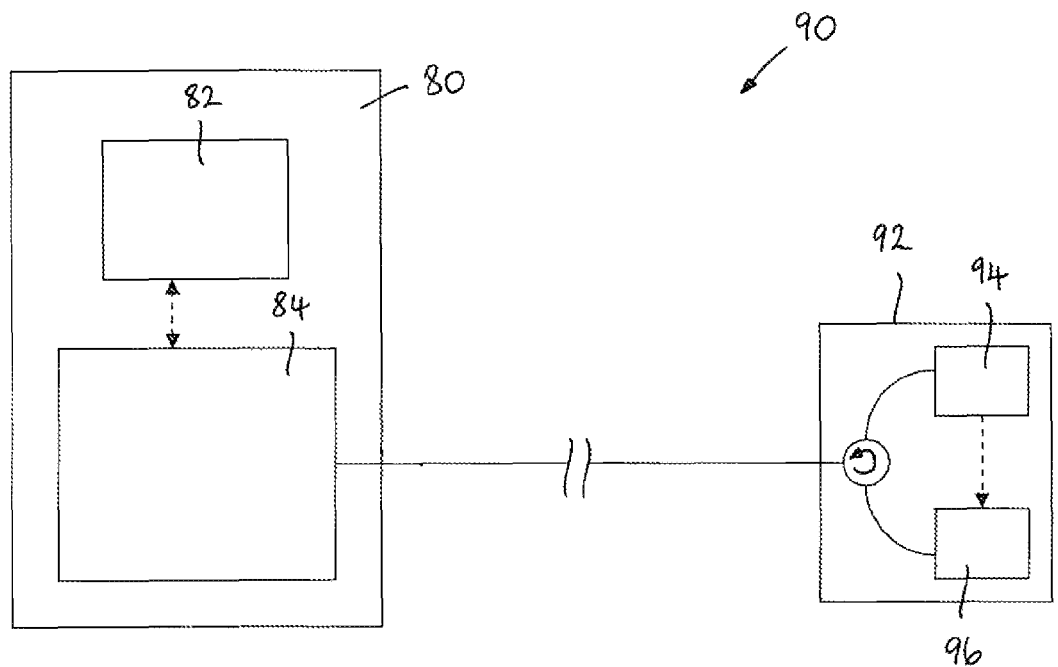
FIG. 9 is a schematic representation of an optical communications network according to a fifth embodiment of the invention.

Referring to FIG. 9, a fourth embodiment of the invention provides an optical communications network 90 comprising an optical communications network element 80 and a node 92.

The optical communications network element 80 is as described above in relation to FIG. 8.

The node 92 comprises optical signal monitoring apparatus 94 and a controller 96. The optical signal monitoring apparatus 94 is arranged to measure an optical parameter of a received optical signal. The controller 96 is arranged to determine a signal quality parameter from the measured optical parameter. The controller 96 is further arranged to generate a measurement signal containing the signal quality parameter and to transmit the measurement signal to the optical communications network element 80.

In a further embodiment, the controller 96 is arranged to transmit the measurement signal from the node 90 to the PCE 84 of the optical communications network element 80 using a PCEP extension.

The controller 96 is arranged to determine one of OSNR, PMD, chromatic dispersion and SPM from the optical parameter measured by the optical signal monitoring apparatus 94.

Figure 10:
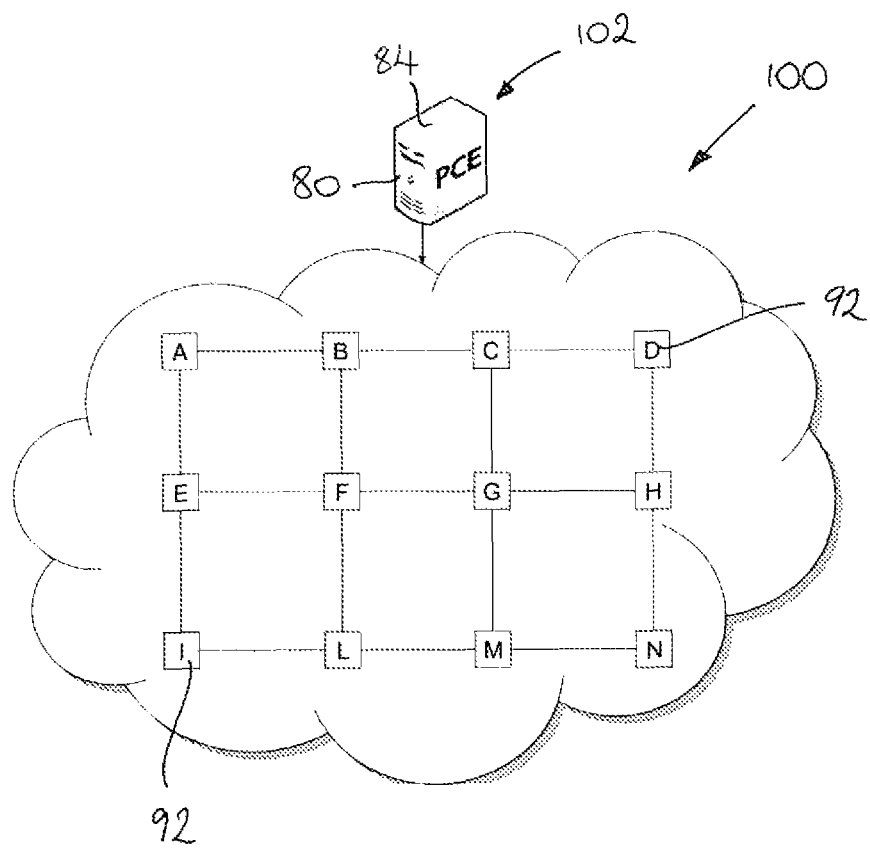
FIG. 10 is a schematic representation of an optical communications network according to a sixth embodiment of the invention.

An optical communications network 100 according to a sixth embodiment of the invention is shown in FIG. 10. The network 100 is substantially the same as the network 90, with the following modifications. The same reference numbers are retained for corresponding features.

In this embodiment, the optical communications network 100 comprises a plurality of nodes 92. Twelve nodes are shown but it will be appreciated that a more or less nodes may comprise an actual communications network.

In this embodiment the network 100 comprises a centralised control plane and the PCE 84 is provided in a network management system 102.

It will be appreciated that where the network 100 comprises a distributed control plane, the PCE 84 is provided in each node 92.

The invention claimed is:

1. A method of configuring a path between an ingress node and an egress node in an optical communications network, the path comprising a first hop and a subsequent hop and the method comprising:
   a. selecting a candidate hop for the first hop of the path;
   b. obtaining a value of a signal feasibility parameter for the candidate hop;
   c. determining whether said value lies within an acceptable value range and if said value lies within said acceptable value range accepting said candidate hop for the first hop of the path and if said value lies outside said acceptable value range repeating steps a. to c.;
   d. selecting a candidate hop for the subsequent hop of path;
   e. obtaining a value of a signal feasibility parameter for a combined path comprising the first hop and the candidate hop for the subsequent hop of the path;
   f. determining whether said value lies within an acceptable value range and if said value lies within said acceptable value range accepting said candidate hop for the subsequent hop of the path and if said value lies outside said acceptable value range repeating steps d. to f.; and
   g. generating and transmitting a control signal for configuring the path,
      wherein each said step of obtaining a value of a signal feasibility parameter comprises checking whether a measured value of the signal feasibility parameter is available and if a said measured value is available retrieving said measured value and if a said measured value is not available calculating an estimated value of the signal feasibility parameter.

2. A method as claimed in claim 1, wherein the method further comprises measuring a value of at least one signal quality parameter of the path at the egress node and storing said at least one measured value.

3. A method as claimed in claim 1, wherein the path comprises a plurality of subsequent hops and the method comprises repeating steps d. to f. for each subsequent hop, the combined path for a current said subsequent hop comprising the first hop, all previously accepted subsequent hops and the candidate hop for the current subsequent hop.

4. A method as claimed in claim 1, wherein the candidate hops are selected using an impairment aware routing and wavelength assignment algorithm.

5. A method as claimed in claim 1, wherein the signal feasibility parameter comprises a Quality of Transmission parameter.

6. A method as claimed in claim 5, wherein if a measured value of the signal feasibility parameter is not available step e. comprises calculating an estimated value of the Quality of Transmission parameter for the combined path based on an optical signal to noise ratio value for each hop.

7. A method as claimed in claim 2, wherein the at least one signal quality parameter comprises one of optical signal to noise ratio and bit error rate.

8. An optical communications network element comprising:
   a memory device arranged to store one or more measured values of a signal quality parameter; and
   a path computation element arranged to configure a path between an ingress node and an egress node in an optical communications network, the path comprising a first hop and a subsequent hop and the path computation element being arranged to:
   a. select a candidate hop for the first hop of the path;
   b. obtain a value of a signal feasibility parameter for the candidate hop;
   c. determine whether said value lies within an acceptable value range and if said value lies within said acceptable value range accept said candidate hop for the first hop of the path and if said value lies outside said acceptable value range repeat steps a. to c.;
   d. select a candidate hop for the subsequent hop of path;
   e. obtain a value of a signal feasibility parameter for a combined path comprising the first hop and the candidate hop for the subsequent hop of the path;
   f. determine whether said value lies within an acceptable value range and if said value lies within said acceptable value range accept said candidate hop for the subsequent hop of the path and if said value lies outside said acceptable value range repeat steps d. to f.; and
   g. generate and transmit a control signal for configuring the path,
      wherein said path computation element is arranged to obtain a value of a signal feasibility parameter by checking whether a measured value of the signal feasibility parameter is available in the memory device and if a said measured value is available retrieving said measured value from the memory device and if a said measured value is not available calculating an estimated value of the signal feasibility parameter.

9. An optical communications network element as claimed in claim 8, wherein the path computation element is further arranged to receive a measured value of at least one signal quality parameter of the path from the egress node and to cause said at least one measured value to be stored in the memory device.

10. An optical communications network element as claimed in claim 8, wherein the path comprises a plurality of subsequent hops and the path computation element is arranged to repeat steps d. to f. for each subsequent hop, the combined path for a current said subsequent hop comprising the first hop, all previously accepted subsequent hops and the candidate hop for the current subsequent hop.

11. An optical communications network element as claimed in claim 8, wherein the path computation element is arranged to select the candidate hops using an impairment aware routing and wavelength assignment algorithm.

12. An optical communications network element as claimed in claim 8, wherein the signal feasibility parameter comprises a Quality of Transmission parameter.

13. An optical communications network element as claimed in claim 12, wherein the path computation element is arranged to calculate an estimated value of the Quality of Transmission parameter for the combined path based on an optical signal to noise ratio value for each hop.

14. An optical communications network element as claimed in claim 9, wherein the at least one signal quality parameter comprises one of optical signal to noise ratio and bit error rate.

15. An optical communications network comprising:
   an optical communications network element as claimed in claim 8; and
   a node comprising optical signal monitoring apparatus arranged to measure an optical parameter of a received optical signal and a controller arranged to determine a signal quality parameter from said measured optical parameter and to generate a measurement signal containing the signal quality parameter and to transmit said measurement signal to the optical communications network element.

16. A non-transitory computer readable storage medium having computer readable instructions embodied therein for providing access to resources available on a processor, the computer readable instructions comprising instructions to cause the processor to configure a path between an ingress node and an egress node in an optical communications network, the path comprising a first hop and a subsequent hop and the instructions comprising instructions to cause the processor to:
   a. select a candidate hop for the first hop of the path;
   b. obtain a value of a signal feasibility parameter for the candidate hop;
   c. determine whether said value lies within an acceptable value range and if said value lies within said acceptable value range accept said candidate hop for the first hop of the path and if said value lies outside said acceptable value range repeat steps a. to c.;
   d. select a candidate hop for the subsequent hop of path;
   e. obtain a value of a signal feasibility parameter for a combined path comprising the first hop and the candidate hop for the subsequent hop of the path;
   f. determine whether said value lies within an acceptable value range and if said value lies within said acceptable value range accept said candidate hop for the subsequent hop of the path and if said value lies outside said acceptable value range repeat steps d. to f.; and
   g. generate a control signal for configuring the path,
   wherein said value of a signal feasibility parameter is obtained by checking whether a measured value of the signal feasibility parameter is available and if a said measured value is available retrieving said measured value of the signal feasibility parameter and if a said measured value is not available calculating an estimated value of the signal feasibility parameter.

* * * * *